(12) United States Patent
Genis et al.

(10) Patent No.: US 7,443,083 B2
(45) Date of Patent: Oct. 28, 2008

(54) PIEZOELECTRIC POWERED VEHICLES AND MOTORS

(75) Inventors: Vladimir Genis, Warminster, PA (US); Alexandre Soukhomlinoff, Passaic, NJ (US)

(73) Assignee: Drexel University, Philadelphia, PA (US)

(*) Notice: Subject to any disclaimer, the term of this patent is extended or adjusted under 35 U.S.C. 154(b) by 112 days.

(21) Appl. No.: 11/380,292

(22) Filed: Apr. 26, 2006

(65) Prior Publication Data

US 2006/0273693 A1 Dec. 7, 2006

Related U.S. Application Data

(60) Provisional application No. 60/675,189, filed on Apr. 27, 2005.

(51) Int. Cl.
*H01L 41/113* (2006.01)
(52) U.S. Cl. ...................................... 310/339
(58) Field of Classification Search ................. 310/339
See application file for complete search history.

(56) References Cited

U.S. PATENT DOCUMENTS

| 3,082,333 | A | * | 3/1963 | Hufferd et al. ............... 310/339 |
| 3,120,220 | A | * | 2/1964 | McCrory et al. ........... 123/46 R |
| 3,156,227 | A | * | 11/1964 | Hufferd ....................... 123/642 |
| 3,354,327 | A | * | 11/1967 | Benson ........................ 310/339 |
| 3,463,943 | A | * | 8/1969 | Parkinson ................... 310/339 |
| 3,559,027 | A | * | 1/1971 | Arsem ............................. 322/3 |
| 4,351,405 | A |   | 9/1982 | Fields |
| 4,511,818 | A | * | 4/1985 | Benjamin et al. ........... 310/338 |
| 5,327,987 | A |   | 7/1994 | Abdelmalek |
| 5,441,122 | A |   | 8/1995 | Yoshida |
| 5,832,885 | A |   | 11/1998 | Moyer |
| 6,107,691 | A |   | 8/2000 | Gore |
| 6,195,999 | B1 |   | 3/2001 | Arnold |
| 6,210,822 | B1 |   | 4/2001 | Abersfelder |
| 6,220,383 | B1 |   | 4/2001 | Muraki |
| 6,392,380 | B2 |   | 5/2002 | Furukawa |
| 6,462,430 | B1 |   | 10/2002 | Joong |
| 6,472,091 | B1 |   | 10/2002 | Konrad |
| 6,488,608 | B2 |   | 12/2002 | Yamaguchi |
| 6,507,127 | B1 |   | 1/2003 | Amano |
| 6,577,022 | B2 |   | 6/2003 | Joong |
| 6,702,053 | B2 |   | 3/2004 | Nogi |
| 6,827,047 | B2 |   | 12/2004 | Qian |
| 7,124,870 | B2 | * | 10/2006 | Ohashi et al. ............... 192/84.9 |
| 2004/0075367 | A1 | * | 4/2004 | Rado .......................... 310/339 |

FOREIGN PATENT DOCUMENTS

CN WO/2006/047926 * 5/2006

* cited by examiner

*Primary Examiner*—Thomas M Dougherty
(74) *Attorney, Agent, or Firm*—Knoble, Yoshida & Dunleavy LLC

(57) ABSTRACT

One or more piezoelectric elements are employed to generate electrical energy from one or both of the mechanical energy of a moving part of a conventional engine or vehicle or the combustion energy of an internal combustion engine. The generated electrical energy can be stored and used to power an electric motor in order to supplement the power generated by the conventional engine.

11 Claims, 6 Drawing Sheets

PIEZOELECTRIC POWERED VEHICLES AND MOTORS

RELATED APPLICATION DATA

This application claims the benefit of U.S. provisional patent application No. 60/675,189, filed on Apr. 27, 2005, under 35 U.S.C. §119(e).

BACKGROUND OF THE INVENTION

1. Field of the Invention

The invention relates to the field of motors. In particular the invention relates to motors and vehicles powered at least in part by a piezoelectric element.

2. Description of the Related Technology

Current reliance on oil and other nonrenewable fuel sources is not beneficial to the environment or to the economy. It is therefore desirable to significantly reduce the consumption of the conventional fuel, diversify transportation fuel supply, and reduce air pollution and global warming.

The hybrid vehicles that are currently available or under development typically use the following alternative sources of energy: ethanol, methanol, compressed natural gas (CNG), liquefied natural gas (LNG), liquefied petroleum gas (LPG), electricity, bio-diesel, and hydrogen. These alternative fuels have a variety of disadvantages. Many of the alternative sources of energy listed above require an additional container for the alternative fuel. Alcohol fuel is expensive to manufacture and not commercially available in all states and countries. There are few suppliers of bio-fuel. LNG is typically used only in heavy-duty vehicles, which are not covered under the state mandate in EPACT in all states. Existing electric and hydrogen vehicles in use are not currently cost-effective. Furthermore, the infrastructure required for utilizing most of the fuels listed above is not in place and would be expensive to create.

Therefore, there exists a need for providing an alternative energy source for operating a vehicle that utilizes existing infrastructure and is cost-effective.

SUMMARY OF THE INVENTION

Accordingly, it is an object of certain embodiments of the invention to provide an alternative energy source for operating a vehicle that utilizes existing infrastructure and/or is cost-effective.

A first aspect of the invention relates to a motor. The motor includes an engine and a piezoelectric element associated with a moving part of said engine in a manner whereby said piezoelectric element generates electrical energy as a result of movement of the moving part of the engine. The engine may be an electric-powered engine to which at least some electricity is supplied by the piezoelectric element, or the engine may be powered by a means other than electricity, in which case the motor will include an electric-powered engine to which at least some electricity is supplied by the piezoelectric element in addition to the non-electric engine.

A second aspect of the invention relates to a vehicle powered, at least in part, using a piezoelectric element. The vehicle will include an electric motor which obtains at least some of its electric power from a piezoelectric element. The piezoelectric element is associated with a moving part of the vehicle in a manner whereby said piezoelectric element generates electrical energy as a result of movement of the moving part.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

In a first aspect, the present invention relates to a motor. The motor includes an engine and a piezoelectric element associated with a moving part of said engine in a manner whereby said piezoelectric element generates electrical energy as a result of movement of the moving part of the engine. The engine may be an electric-powered engine to which at least some electricity is supplied by the piezoelectric element.

In another embodiment, the motor of the present invention is a hybrid piezoelectric motor (HPEM™) that uses one or more piezoelectric devices for generating electrical power for an electric motor in order to supplement the power generated by an engine that employs a non-electric power source. The non-electric engine may be powered, for example, by conventional fuels, such as gasoline, diesel fuel, oil, ethanol, methanol, compressed natural gas (CNG), liquefied natural gas (LNG), liquefied petroleum gas (LPG), bio-diesel, and hydrogen.

Use of piezoelectric devices for powering a supplemental electric motor permits mechanical energy of the conventional engine to be converted to supplemental electrical energy without requiring significant changes in the design of existing engines. Using piezoelectric elements for generating supplemental power can significantly improve the cost-effectiveness of hybrid motors and simplify the charging system for hybrid electric vehicles.

Piezoelectric devices can be used to transform the mechanical energy of moving parts, such as pistons or crankshafts, into electrical energy. Alternatively, piezoelectric devices can be used to transform energy of combustion, as exerted on a piezoelectric device, into electrical energy. The generated electrical energy may be stored in a capacitor, battery or any other suitable energy storage device for storing electrical energy. The stored electrical energy may then be used to power an electric motor, which may operate on its own or may supplement a conventional engine or, alternatively, which may work independently of a conventional engine.

Figure 1:
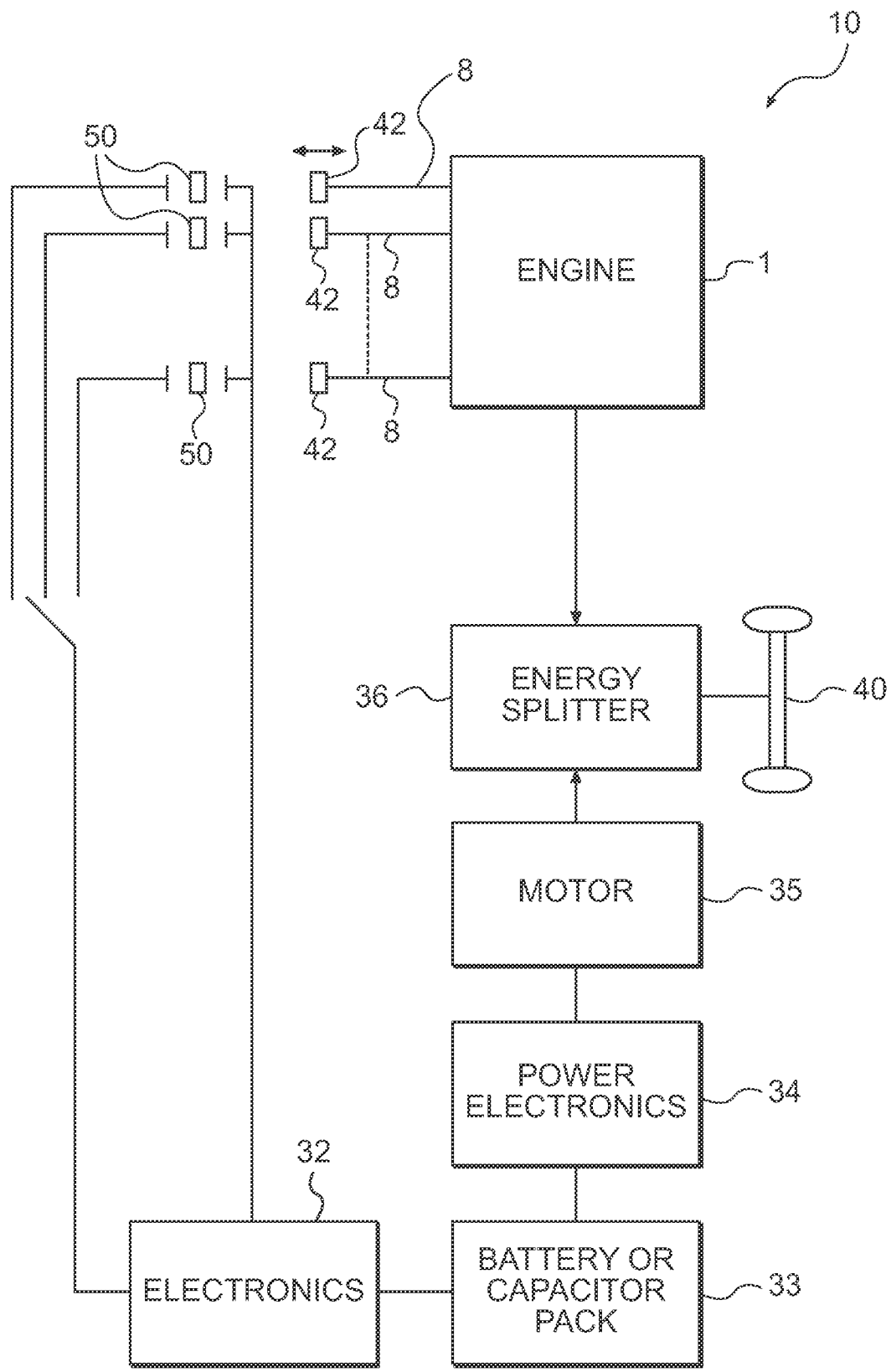
FIG. 1 shows a diagram of an engine provided with one or more piezoelectric elements associated with one or more moving parts of the engine.

A simplified schematic of a hybrid piezoelectric motor 10 is presented in FIG. 1. In the embodiment of the piezoelectric motor shown in FIG. 1, one or more mechanical elements 42 are associated with one or more moving parts of a conventional engine 1. Mechanical elements 42 may be, for example, plates, hammers or the like, made of metal or any suitable, rigid material, such as ceramics and rigid plastics. One or more piezoelectric elements 50 are positioned to contact mechanical elements 42 as a result of movement of mechanical elements 42 responsive to movement of one or more moving parts of conventional engine 1. Piezoelectric elements 50 generate electricity in response to a stress or strain force being exerted on the material of piezoelectric elements 50. Therefore, as a result of contact between mechanical elements 42 and piezoelectric elements 50, electrical energy is generated.

In the embodiment shown in FIG. 1, a mechanical element 42 is attached to each piston 8, of the engine 1. When pistons 8 move, as a result of combustion in the cylinders, mechanical elements 42 contact piezoelectric elements 50. Piezoelectric elements 50 may be placed in any suitable location, so long as mechanical elements 42 contact piezoelectric elements 50 as a result of the movement of pistons 8.

Preferably, piezoelectric elements 50 are made from a piezoelectric material with a relatively high electromechanical coefficient, to thereby maximize the electrical energy generated by the mechanical energy exerted on piezoelectric elements 50. The mechanical stress in piezoelectric elements 50 caused by the applied mechanical energy from mechanical elements 42 is transformed into electrical voltage, which may be applied to capacitor 33, or stored in a battery or other suitable electrical energy storage device. The stored electrical energy may subsequently be used to power electric motor 35. Preferably, mechanical elements 42 are sufficiently small and lightweight that substantially no additional energy is required to move pistons 8 equipped with mechanical elements 42. This is generally possible since the energy of combustion in the cylinder typically provides sufficient energy to pistons 8 that a small amount of additional weight and friction, caused by mechanical elements 42, will not require expenditure of additional energy to drive pistons 8.

The electrical energy generated by piezoelectric elements 50 can then be stored in an electrical energy storage device, such as a capacitor or battery 33, with the help of associated electronics 32. Connected between capacitor or battery 33 and electric motor 35 are power electronics 34 that function to feed electricity from capacitor or battery 33 to electric motor 35, and to control operation of electric motor 35. Optionally, connected to electric motor 35 and engine 1 may be an energy splitter 36 that splits the energy that is provided by engine 1 and electric motor 35 to provide output power. For example, a vehicle's axle and wheels 40 may be connected to energy splitter 36. Energy splitter 36 may allow for energy to come from one or both of engine 1 and electric motor 35 at any given time. In one embodiment, electric motor 35 only operates when engine 1 is not generating power. In another embodiment, engine 1 and electric motor 35 may operate simultaneously.

Figure 2:
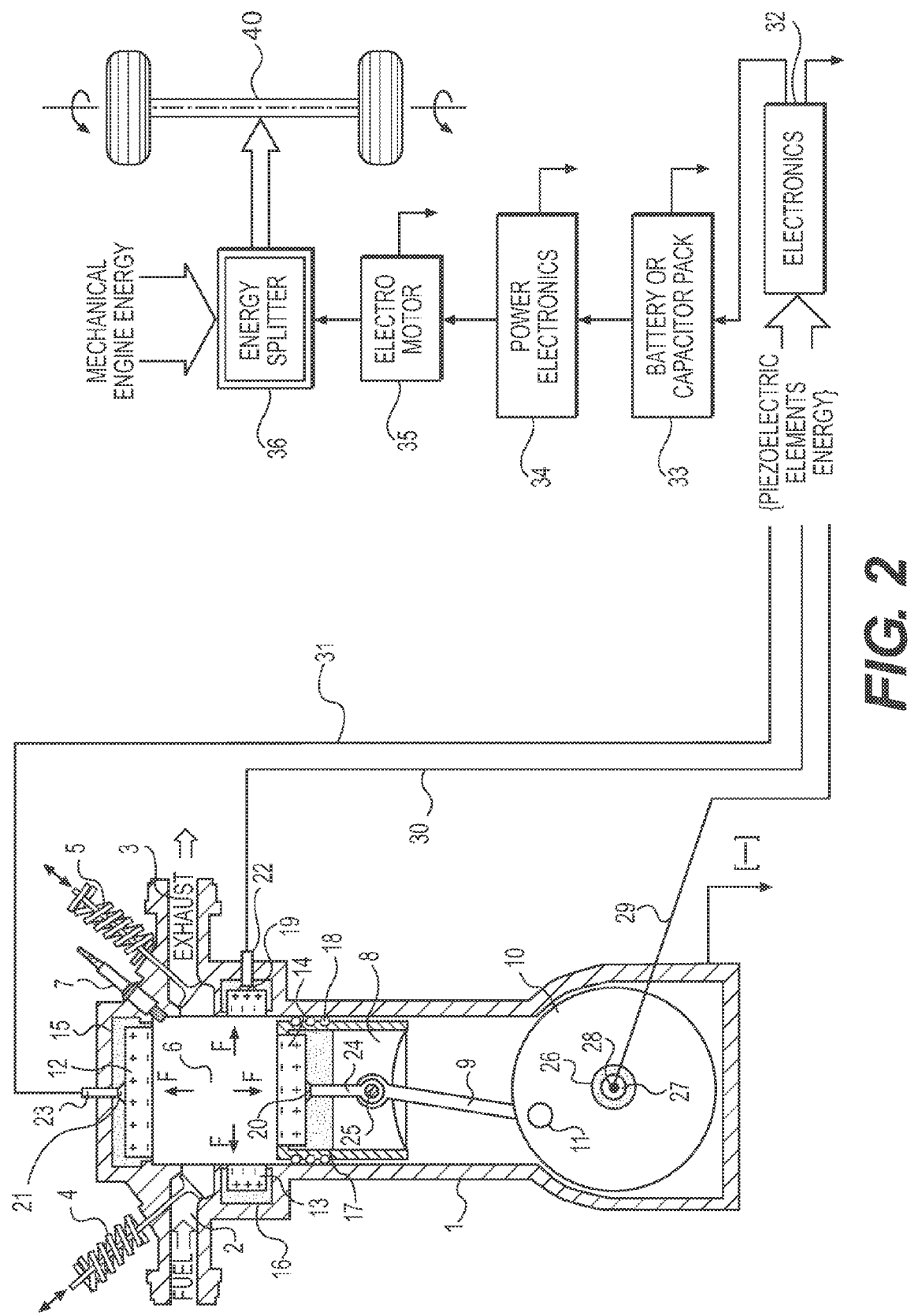
FIG. 2 shows an alternative embodiment of an engine that utilizes a combustion chamber provided with one or more piezoelectric elements.

In an alternative embodiment, piezoelectric elements can be positioned such that a force created by the conventional engine impinges on the piezoelectric elements to thereby cause sufficient strain in the piezoelectric elements to generate electricity. For this purpose, one or more piezoelectric elements can be installed in, for example, a combustion chamber, as shown in FIG. 2. When the fuel is ignited, an explosion occurs in the combustion chamber. The force from the explosion impinges on one or more piezoelectric elements to thereby cause the piezoelectric elements to produce electrical energy.

FIG. 2 shows a schematic diagram of an alternative embodiment of engine 1 of motor 10 having a plurality of piezoelectric elements 12, 13 and 14 provided in combustion chamber 6. The depicted embodiment employs an upper piezoelectric element 12, a toroidal or annular piezoelectric element 13, and lower piezoelectric element 14. These piezoelectric elements 12-14 are used to directly convert energy produced by combustion into electrical energy. Additional piezoelectric elements may be placed at additional locations within combustion chamber 6, if desired. Again, since the energy released by combustion is generally more than is required to drive pistons 8, typically no additional combustion energy will be required to cause piezoelectric elements 12-14 to generate electrical energy.

Electrical insulators 15, 16, and 17 may be used to insulate piezoelectric elements 12-14. Electrical contacts 19, 20, and 21 are connected to piezoelectric elements 12-14, respectively. Electrical contacts 19-21 conduct electrical energy generated by piezoelectric elements 12-14 via electrical connectors 22-24 and electric cables 29-31, to electronics 32 for storage in a suitable electrical storage device. Electrical contact 19 is connected to toroidal or annular piezoelectric element 13. Electrical contact 20 is connected to lower piezoelectric element 14. Electrical contact 21 is connected to upper piezoelectric element 12.

Electrical contact 19 is further connected to electrical connector 22, which in turn is connected via electric cable 30 to electronics 32. Electrical contact 21 is connected to electrical connector 23, which is connected via electric cable 31 to electronics 32. Lower piezoelectric element 14 is connected via electrical contact 20 to electronics 32. Electrical contact 20 is connected to electrical connector 24, which in turn is connected to electrical cable 29, which runs the length of connecting rod 9 and is connected to electronics 32. Connecting rod 9 is attached to crankshaft 39 by rod bearing 11. At the axis of crankshaft 39, sliding contact 28 and dielectric plug 26 may be connected, as shown, to facilitate the connection of electrical cable 29 with electrical connector 24.

Also shown in FIG. 2 is intake port 2, where fuel enters into engine 1, and exhaust port 3, where exhaust exits engine 1. Intake valve 4 has a rocker arm and spring and operates to open and close intake port 2. Exhaust valve 5 has a rocker arm and spring and is used to open and close exhaust port 3. Combustion chamber 6 is where fuel is ignited by spark plug 7 in order move piston 8. Piston 8 is connected via connecting rod 9 to crankshaft 39 and is surrounded by piston ring 18. Pin 25 enables piston 8 to move during the rotation of crankshaft 39. Crankshaft 39 has rod-bearing 11, which is where connecting rod 9 is connected and enables the movement of piston 8 to be translated into the rotational movement of crankshaft 39, which provides the mechanical energy to engine 1. Crankshaft 39 has a dielectric plug 26 that further insulates electric cable. Drive shaft 27 is used in order to translate the motion of piston 8 and crankshaft 39 into the motion of vehicle 10.

Electronics 32 are connected to capacitor or battery 33, or any suitable electrical energy storage device. Capacitor or battery 33 stores the electrical energy generated by piezoelectric elements 12-14. The stored energy may be used to run power electronics 34 which power and operate electric motor 35. Electric motor 35 is connected to energy splitter 36, which splits the energy provided by electric motor 35 and the energy provided by engine 1. The energy from energy splitter 36 may then be used, for example, to drive wheels 40 of vehicle 10.

As will be apparent to a skilled person, the hybrid piezoelectric motors of the present invention can be employed in a variety of applications, such as in vehicles, construction and mining equipment, and similar devices. One advantage of the present invention is that it can be retrofitted with existing engines and/or easily added to current engine designs, requiring only minor modifications thereto. The system generates electrical energy without requiring additional energy input to the engine.

Combinations of various aspects of the embodiments of FIGS. 1 and 2 may also be employed. For example, piezoelectric elements may be associated both with moving parts of engine 1 and be located in combustion chamber 6 of engine 1 to provide energy from two different sources.

In another embodiment, the present invention relates to a hybrid piezoelectric vehicle (HPEV™). In one embodiment, the hybrid piezoelectric vehicle may employ one of the embodiments of the hybrid piezoelectric motor of the present invention described above. In another embodiment, the hybrid piezoelectric vehicle may include at least one piezoelectric element be associated with one or more of a variety of moving parts of the vehicle, other than parts of the engine, such as shock absorbers, crankshafts, axles, drive shafts, etc. In this manner, a proportion of the mechanical energy, other than mechanical energy associated with the engine, that is typically lost may be converted to electrical energy.

Thus, the hybrid piezoelectric vehicle of the present invention may include one or more piezoelectric elements, each of which may be associated with a moving part of the vehicle or its engine, or located at a location whereby a force generated by the vehicle or the engine will impinge upon the piezoelectric element. Any combination of one or more of these locations and types of piezoelectric energy generation may be employed in the hybrid piezoelectric vehicle of the present invention.

Figure 6:
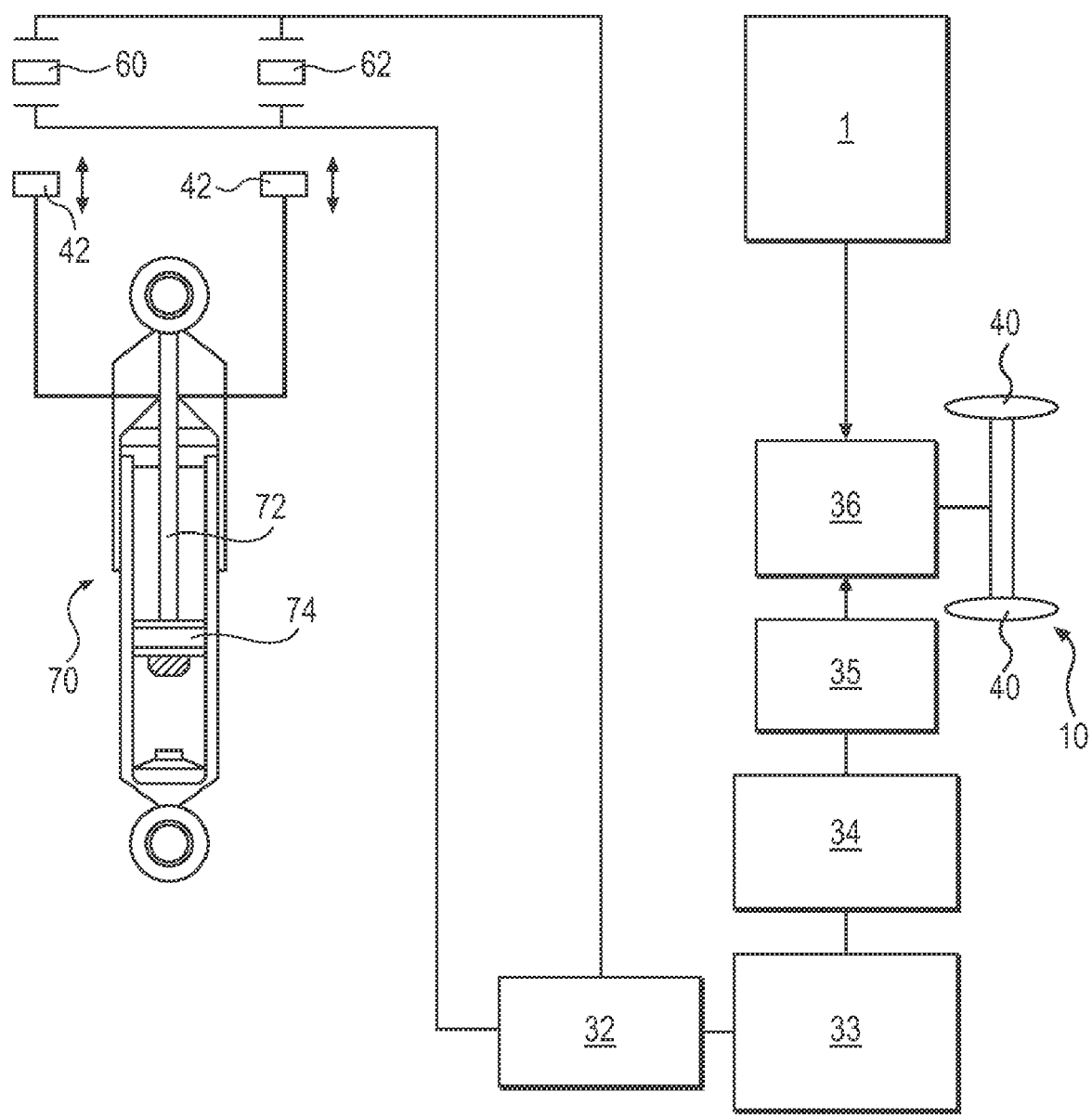
FIG. 6 shows a schematic diagram of a vehicle equipped with piezoelectric elements associated with a shock absorber.

FIG. 6 shows a schematic diagram of a vehicle equipped with piezoelectric elements associatedwith a shock absorber. In the embodiment of FIG. 6, one or more mechanical elements 42 areassociated with one or more moving parts of a shock absorber 70. Mechanical elements 42 may be, for example, plates, hammers or the like, made of metal or any suitable, rigid material, suchas ceramics and rigid plastics. One or more piezoelectric elements 60, 62 are positioned tocontact mechanical elements 42 as a result of movement of mechanical elements 42 responsive to movement of one or more moving parts of shock absorber 70. Specifically, mechanicalelements 42 may be connected to piston rod 72 of shock absorber 70 such that movement ofpiston 74 indirectly results in exertion of a stress or strain force by mechanical elements 42 on piezoelectric elements 60, 62. Piezoelectric elements 60, 62 generate electricity in response to astress or strain force being exerted on the material of piezoelectric elements 60, 62. Therefore, as a result of contact between mechanical elements 42 and piezoelectric elements 60, 62, electricalenergy is generated. In one embodiment, mechanical elements 42 are arranged for contact withpiezoelectric elements 60 when piston 74 of shock absorber 70 reaches either the top or the bottom of its stroke, in order to maximize electrical energy generation based on movement of themoving parts of shock absorber 70. In this embodiment the mechanical elements 42 contact the piezoelectric elements 60 when the piston 74 moves in both directions, that is to say when itmoves in both a first direction and a second direction.

Electronics 32 are connected to capacitor or battery 33, or any suitable electrical energy storage device. Capacitor or battery 33 stores the electrical energy generated by piezoelectric elements 60, 62. The stored energy may be used to run power electronics 34 which power and operate electric motor 35. Electric motor 35 is connected to energy splitter 36, which splits the energy provided by electric motor 35 and the energy provided by engine 1. The energy from energy splitter 36 may then be used, for example, to drive wheels 40 of vehicle 10.

EXAMPLES

Figure 3:
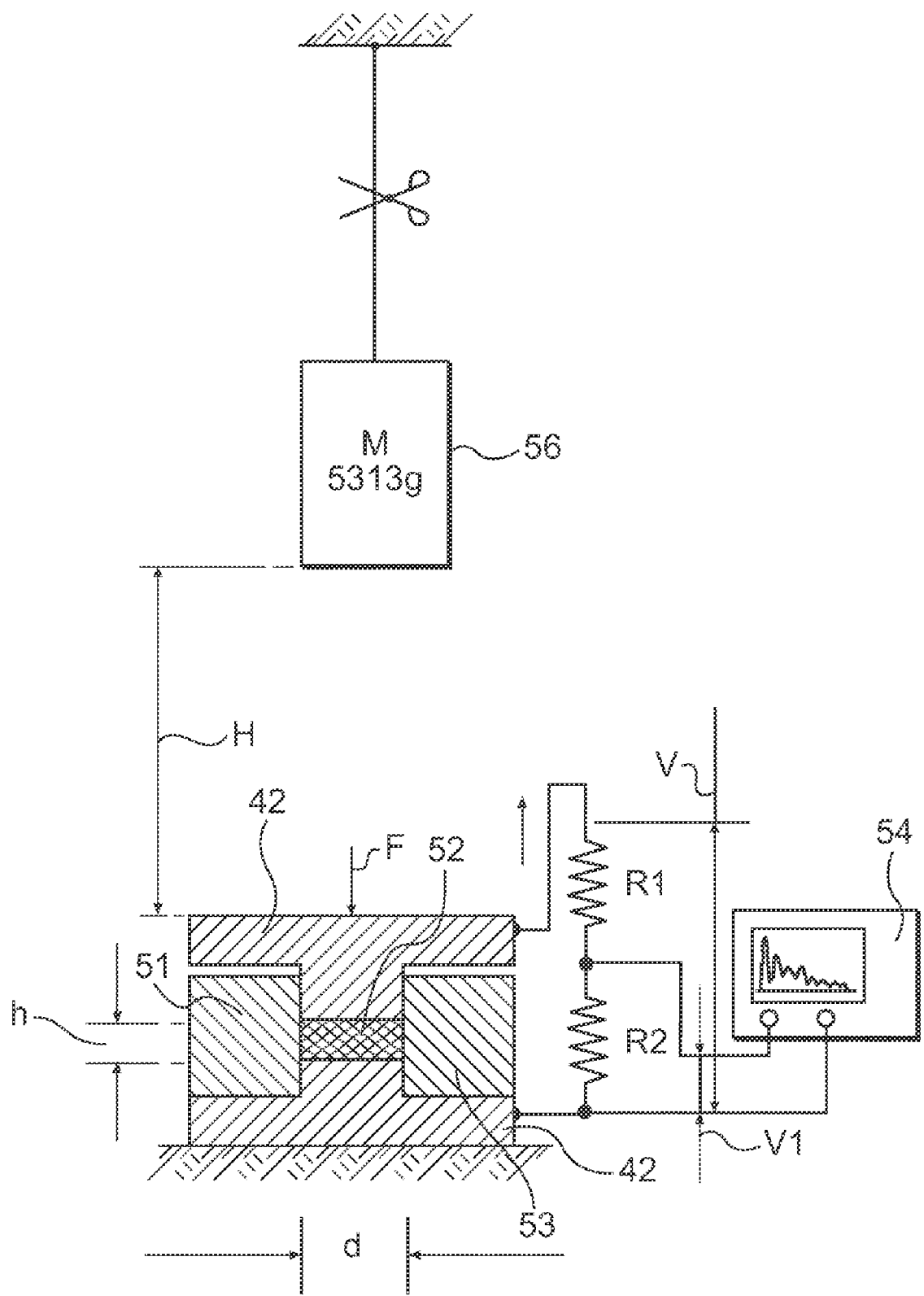
FIG. 3 shows a diagram of an experimental setup to demonstrate the ability of the piezoelectric elements to generate energy under simulated conditions.

In order to demonstrate the activity of piezoelectric elements the following examples are provided. FIG. 3 shows a diagram of a set-up used in the examples. Piezoelectric elements 51, 53 are placed in holder 52 between two metal plates 42. Oscilloscope 54 is attached to metal plates 42. Mass 56 is suspended above the piezoelectric elements 51, 53.

Mass 56 is a 5.313 kg object that was dropped onto the two disc shaped piezoelectric elements 51, 53 to simulate the force that moving parts of an engine would exert on piezoelectric elements 51, 53. The procedure was repeated twice. Each time, the voltage between the two parallel surfaces of the piezoelectric elements 51, 53 was recorded by oscilloscope 54 using a voltage divider and a 10:1 attenuator. The first piezoelectric element 51 has a diameter of 9.56 mm and a height of 1 mm. The second piezoelectric element 53 has a diameter of 6.96 mm and a height of 8.86 mm.

Figure 4:
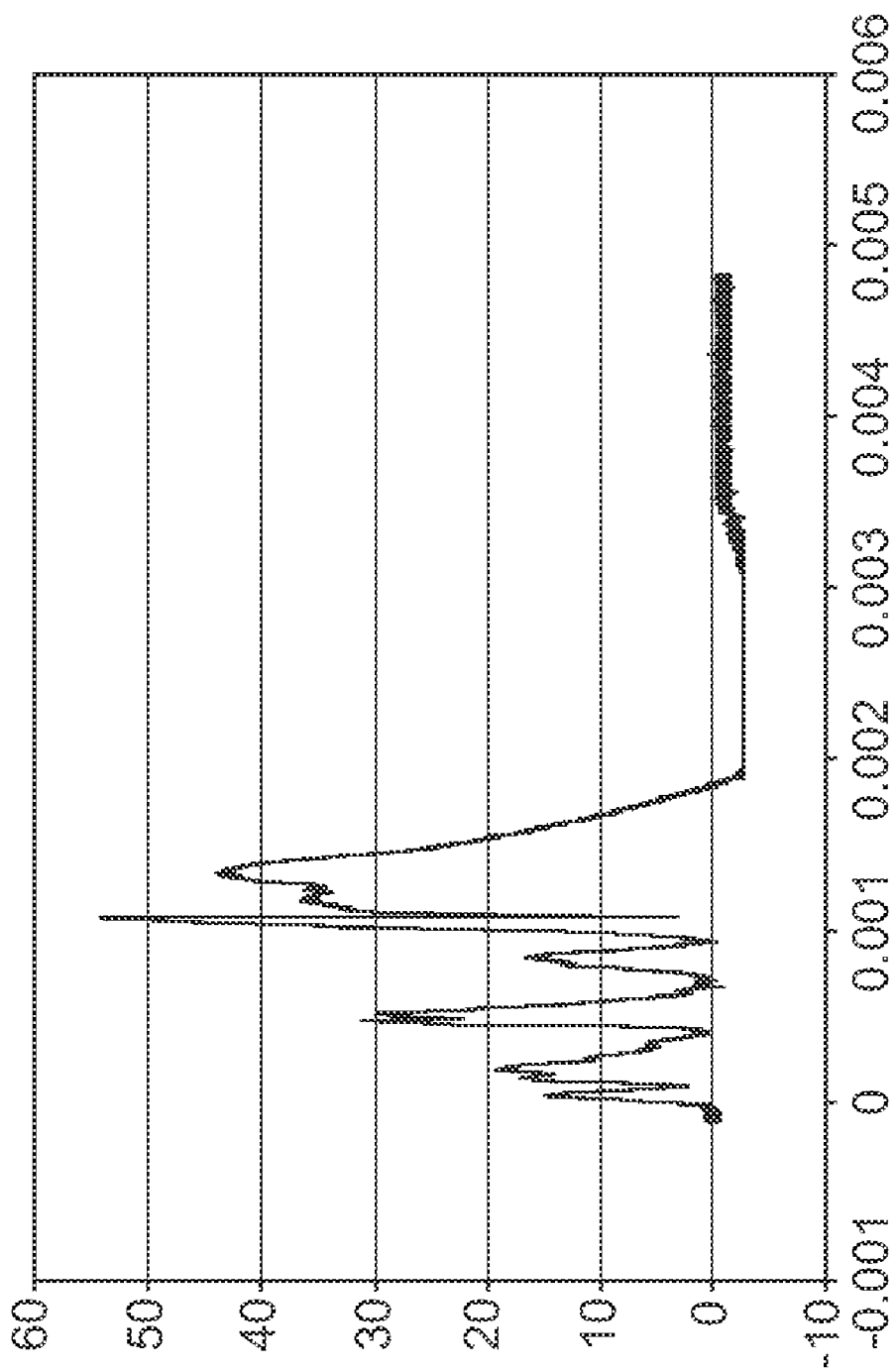
FIG. 4 shows a voltage oscillogram demonstrating the ability of the piezoelectric elements to generate energy under simulated conditions.
Figure 5:
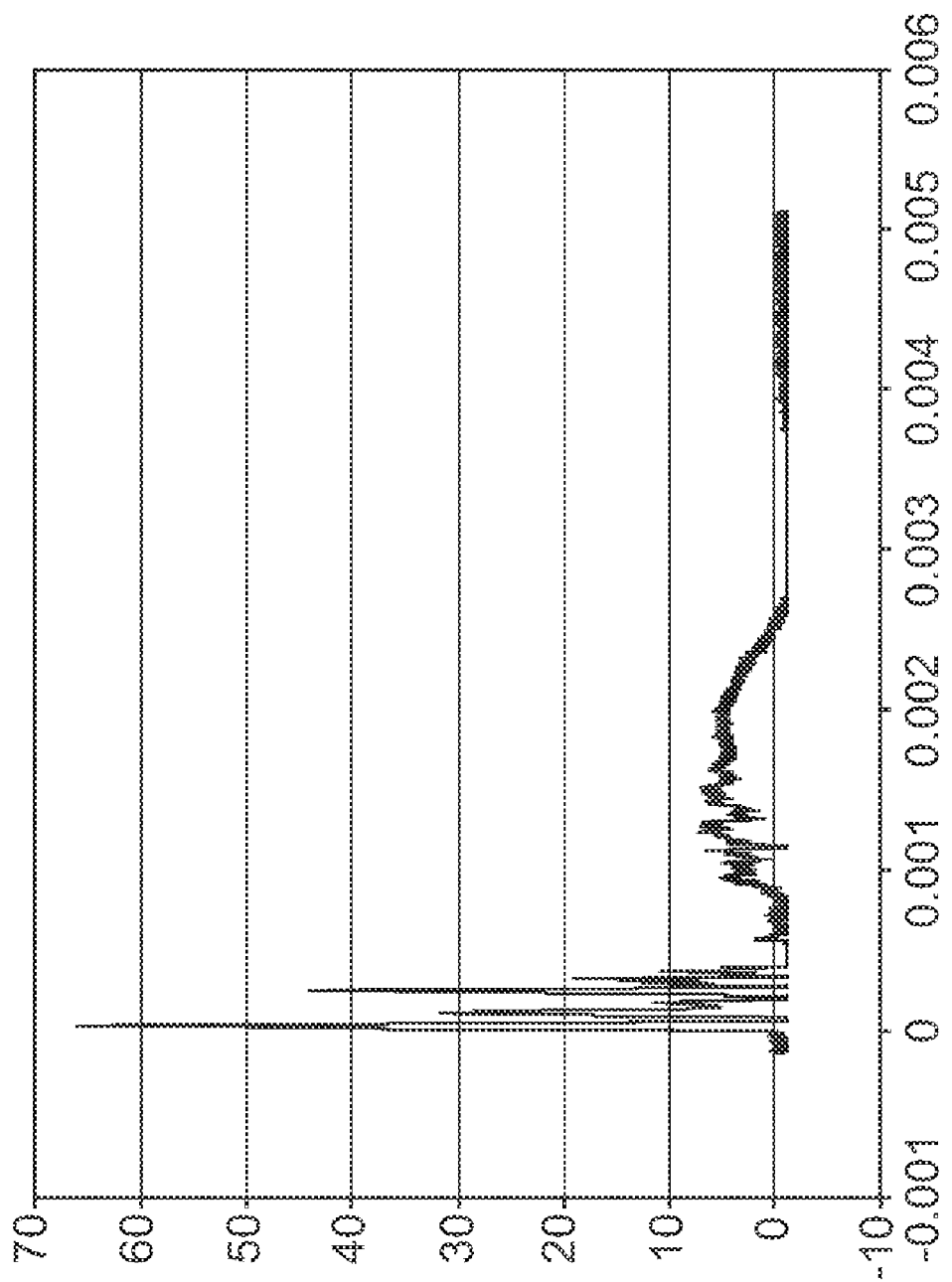
FIG. 5 shows another voltage oscillogram demonstrating the ability of the piezoelectric elements to generate energy under simulated conditions.

In the first test, mass 56 was dropped from a height of 1.08 m and the voltage divider was constructed of two resistors, $R_1=100$ k$\Omega$ and $R_2=3.3$ k$\Omega$. In the second test, mass 56 was dropped from a height of 1.75 m and the voltage divider was constructed of two resistors, $R_1=100$ k$\Omega$ and $R_2=1.5$ k$\Omega$. Recorded voltages for the experiments are presented in FIGS. 4 and 5, respectively, which show the oscillograms generated by oscilloscope 54.

Using the respective values of the resistors $R_1$ and $R_2$, and the attenuation coefficient of the attenuator, the voltage amplitude in the first test was 16.7 kV, and the voltage amplitude in the second test was 44.7 kV. The test results demonstrate that piezoelectric devices 51 and 53 can effectively be used to generate sufficient electric energy for powering an electric motor using the mechanical energy of various moving parts of conventional engines.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A hybrid piezoelectric motor, said device comprising:
   at least one moving part, wherein said moving part has a plate or hammer affixed to said moving part, and further wherein said plate or hammer contacts a first piezoelectric element as a result of movement of said moving part in a first direction and said plate or hammer contacts a second piezoelectric element as a result of movement of said moving part in a second direction,
   the first and second piezoelectric elements positioned to contact at least a portion of said at least one moving part to thereby generate electrical energy as a result of a force exerted on the first and second piezoelectric elements by contact with the portion of said moving part, and
   an electric motor operably connected to said first and second piezoelectric elements for conversion of electrical energy generated by said first and second piezoelectric elements to mechanical energy.

2. A hybrid piezoelectric motor as claimed in claim 1, wherein said at least one moving part is a moving part of an engine that is not powered by electrical power.

3. A hybrid piezoelectric motor as claimed in claim 2, wherein said at least one moving part is selected from the group consisting of a piston and a crankshaft.

4. A hybrid piezoelectric motor as claimed in claim 3, wherein said engine is powered by a fuel selected from the group consisting of gasoline, diesel fuel, oil, ethanol, methanol, compressed natural gas (CNG), liquefied natural gas (LNG), liquefied petroleum gas (LPG), bio-diesel, and hydrogen.

5. A hybrid piezoelectric motor as claimed in claim 4, further comprising an energy storage device operably connected to said first and second piezoelectric elements for storing electrical energy generated by said first and second piezoelectric elements.

6. A hybrid piezoelectric vehicle, comprising:
a first and second piezoelectric element positioned in said vehicle to generate electrical energy as a result of a force exerted on the first and second piezoelectric elements,
a moving part, wherein said moving part has a plate or hammer affixed to said moving part, and further wherein said plate or hammer contacts the first piezoelectric element as a result of movement of said moving part in a first direction and said plate or hammer contacts the second piezoelectric element as a result of movement of said moving part in a second direction;
an electric motor operably connected to said first and second piezoelectric elements for conversion of electrical energy generated by said first and second piezoelectric elements to mechanical energy; and
a drive system for propelling said vehicle using said mechanical energy.

7. A hybrid piezoelectric vehicle as claimed in claim 6, further comprising an engine that is not powered by electricity.

8. A hybrid piezoelectric vehicle as claimed in claim 7, wherein said engine is powered by a fuel selected from the group consisting of gasoline, diesel fuel, oil, ethanol, methanol, compressed natural gas (CNG), liquefied natural gas (LNG), liquefied petroleum gas (LPG), bio-diesel, and hydrogen.

9. A hybrid piezoelectric vehicle as claimed in claim 7, further comprising an energy splitter for alternately or simultaneously transmitting the mechanical energy from said engine and said electric motor to said drive system.

10. A hybrid piezoelectric vehicle as claimed in claim 7, wherein at least one of the first and second piezoelectric elements is operably associated with a moving part selected from the group consisting of a shock absorber and a drive shaft.

11. A hybrid piezoelectric vehicle as claimed in claim 7, wherein at least one of said first and second piezoelectric element is operably associated with a moving part of the engine of said vehicle and at least one of said first and second piezoelectric element is operably associated with a moving part selected from the group consisting of a shock absorber and a drive shaft.

* * * * *